United States Patent [19]
Shemenski et al.

[11] Patent Number: 5,215,613
[45] Date of Patent: Jun. 1, 1993

[54] METHOD FOR MAKING KNOTLESS BEAD BUNDLE

[75] Inventors: Robert M. Shemenski, North Canton; Eddie F. Riggenbach, Rootstown; Amit Prakash, Hudson, all of Ohio

[73] Assignee: The Goodyear Tire & Rubber Company, Akron, Ohio

[21] Appl. No.: 478,309

[22] Filed: Feb. 12, 1990

[51] Int. Cl.$^5$ .............................. B29D 30/50
[52] U.S. Cl. .................. 156/136; 156/422; 156/460; 152/540; 245/1.5
[58] Field of Search ........... 152/539, 540; 245/1.5; 156/136, 422, 460; 57/23, 201, 202, 210, 902

[56] References Cited
U.S. PATENT DOCUMENTS

| | | | |
|---|---|---|---|
| 1,763,179 | 6/1930 | Pierce | 152/540 |
| 1,781,650 | 11/1930 | Teegarden . | |
| 1,969,438 | 8/1934 | Warden . | |
| 2,014,359 | 9/1935 | Morrison . | |
| 2,081,096 | 5/1937 | Reed . | |
| 2,292,980 | 8/1942 | White | 152/540 |
| 3,106,952 | 10/1963 | Rudder | 245/1.5 |
| 3,390,714 | 7/1968 | Marzocchi et al. | 152/540 |
| 4,097,321 | 6/1978 | Kelly et al. | 156/136 |
| 4,820,563 | 4/1989 | Rausch . | |

FOREIGN PATENT DOCUMENTS 0022204  2/1977  Japan ................ 245/1.5

OTHER PUBLICATIONS

"Knots and How To Tie Them" Boy Scouts of America, 1987, p. 7.
"The Story of Tire Beads and Tires"; W. E. Burton, 1954; p. 95.
"Websters II New Riverside University Dictionary"; p. 1314; 1984.

*Primary Examiner*—Michael W. Ball
*Assistant Examiner*—Nancy T. Krawczyk
*Attorney, Agent, or Firm*—David E. Wheeler

[57] ABSTRACT

A method for making a knotless bead bundle, a bead bundle made according to the method, and a tire made using the knotless bead bundle are provided. In the method a bead ring is made using a plurality of annular turns of wire as is conventional in the art, and the annular turns of wire are wrapped with cord, tape, or other conventional wrapping material which is held on the bead ring without using knots. The wrap is held on the bead ring by using a tie down area that is made by forming a loop in the wrapping material, holding the loop in place by a number of close turns of wrap on the bead ring while leaving a first end of the wrapping material free, wrapping the bead ring 360° around the ring, passing a second end of the wrapping material through the loop, closing the loop by pulling the first end of the wrapping material whereby closing the loop pulls the second end of the wrapping material under the close turns of wrapping material. The ends of the wrap are then cut flush with the close turns of wrap. A tire made using the bead bundle of the invention durability. demonstrates improved uniformity, stability and 8 Claims, 3 Drawing Sheets

METHOD FOR MAKING KNOTLESS BEAD BUNDLE

BACKGROUND OF THE INVENTION

The invention relates to a bead bundle intended for use in pneumatic tires, a method of making such a bead bundle, and pneumatic tires incorporating such a bead bundle.

In the construction of a tire, a bead ring provides reinforcement in the tire where the tire meets the rim. The bead ring is often made in the form of a bead bundle which comprises at least one (preferably one) strand of wire disposed in a plurality of adjacent annular turns which are wrapped with wire or another suitable material to hold the ends of the wire and the annular turns together. The ends of the wire or other wrapping material are ordinarily tucked under one of the wraps or knotted to retain the wrapping material on the bead bundle. Unfortunately, in the case where a wire wrap is used, when the bead bundle is deployed in a tire the exposed ends of the wire can sometimes, over time, cause a fault or tear to develop in the bead area of the tire, limiting the life of the tire. Also, when a wrap less stiff than wire is used, the knot used to secure the wrap can cause an imbalance in the weight distribution and gauge of the bead bundle and jeopardize the uniformity of a tire in which it is used. In both cases, when there are exposed free ends of wrap, or when the wrap is knotted, the ends of the knot may trap air in the area of the bead bundle during the building of a tire which may cause eventual delamination of the bead in the tire construction. Such defects are detectable on inspection, and such tires have to be scrapped.

Often, during the construction of a tire the bead bundle undergoes a deformation. It is believed that this bead deformation takes place when a tire construction is cured. Though not seriously detrimental to the operation of the tire, bead deformation substantially obviates the ability of the tire manufacturer to design an optimal bead shape and retain the optimized bead shape in an actual tire construction.

It is an object of the invention to provide a method of making a bead bundle and a bead bundle made thereby having improved uniformity and a construction that substantially eliminates the trapping of air in a tire construction. It has surprisingly been found in accordance with the invention that the method provides a bead bundle which is stable during the construction of a tire and substantially retains its shape during the curing of a tire.

It is also an object of the invention to provide a pneumatic tire using the bead bundle of the invention which has improved uniformity and endurance, and is made such that the number of scrap tires produced is reduced.

SUMMARY OF THE INVENTION

A method for making a knotless bead bundle is provided. The method comprises the steps of disposing at least one wire strand in a plurality of adjacent annular turns: attaching a flexible wrapping material to the annular turns by contacting a first end of the wrapping material with the annular turns and forming a loose loop of wrapping material using a portion of wrapping material adjacent to said first end and securing said loop by wrapping additional wrapping material around said portion of wrapping material in several close wraps, leaving the first end free to hold the loop and first free end in place; wrapping the annular turns with the wrapping material continuously from the loop around the annular turns and back to the loop; passing the wrapping material through the loop; and pulling the first end of the wrapping material to close the loop and to pull the wrapping material under the several close wraps adjacent to the loop. In a preferred embodiment, in order that the bead bundle have an even weight distribution, additional areas of close wraps may be provided at evenly spaced locations on the annular turns of wire. The loop may be placed on a hook or other holding means in the method to maintain the loop while the wrapping of the annular turns of wire is completed. The wrapping material is preferably a flexible material having good tensile strength and may be selected from the group comprising nylon cord, polyester cord, carbon fiber filaments, polyaromatic amide cord and wire. It is desirable that the wrapping material be coated with an adhesive which is compatible with rubber to ensure good adhesion of the wrapping material to the tire.

Also provided is a bead bundle made in accordance with the method of the invention.

Also provided is a pneumatic tire which is made using the bead bundle of the invention.

DEFINITIONS

As used herein, the term:

"close wraps" refers to turns of wrapping material which are laid down substantially side-by-side on a bead ring:

"widely spaced wraps" refers to widely separated turns of wrapping material which are laid down on a bead ring:

"tie down area" refers to close wraps which are used specifically to secure the ends of a bead wire which is disposed in a plurality of annular turns.

DETAILED DESCRIPTION OF THE INVENTION

Figure 1:
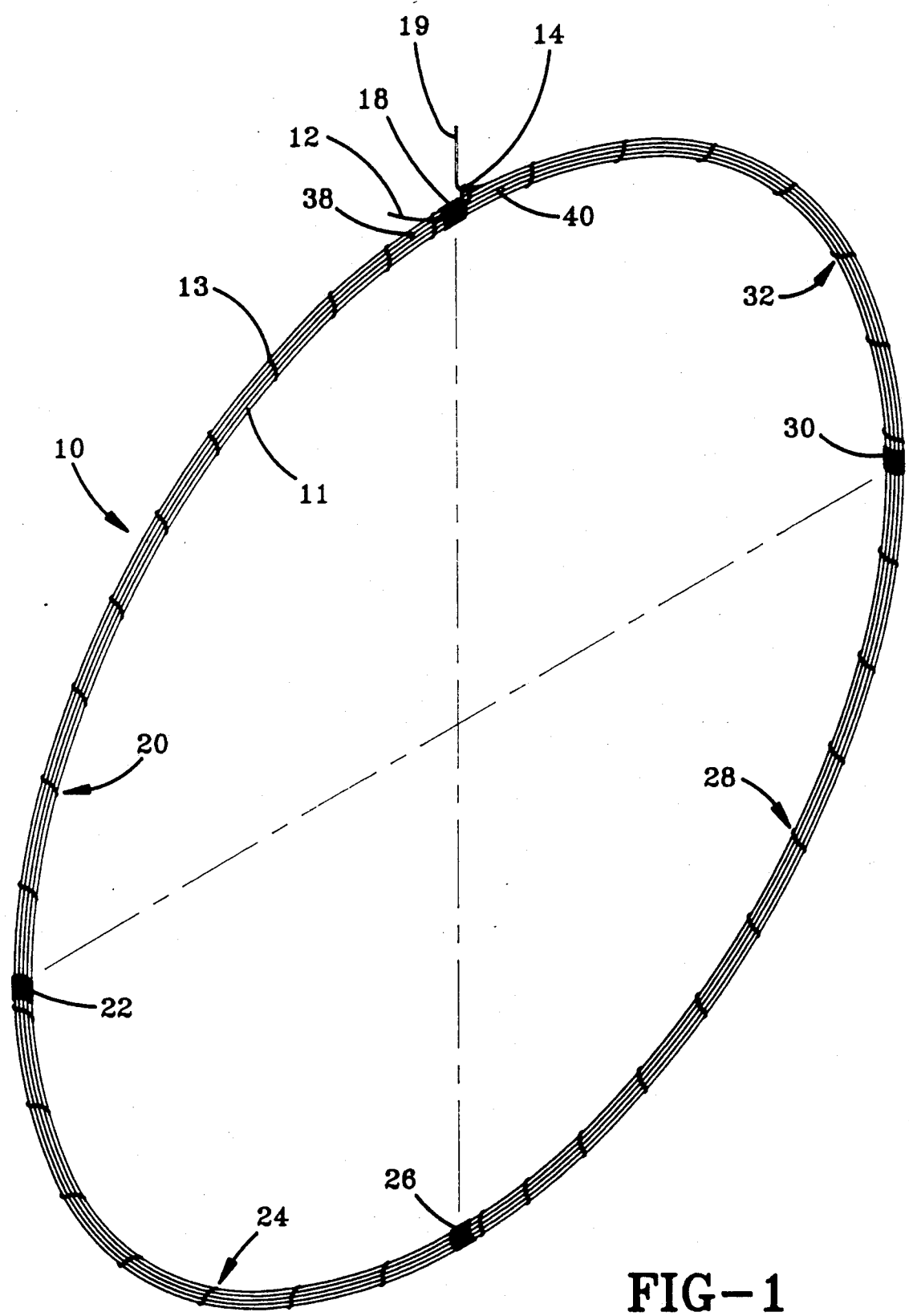
FIG. 1 illustrates a bead bundle made according to the invention.

With reference now to FIG. 1, one possible configuration of the bead bundle 10 of the invention is illustrated. In the illustrated embodiment bead bundle 10 comprises a single strand of wire 11 which is wound in a plurality of adjacent annular turns to comprise a ring having a number of layers of wire. The annular turns of wire are held together by tightly wrapped wrapping material 13 which also serves to hold down ends 38 and 40 of the wire. In the preferred embodiment ends 38 and 40 will be in close proximity to one another on the ring so that ends 38 and 40 can both be secured using one tie down area 18 of wrapping material. In the illustrated embodiment, in order that ring bundle 10 be as uniform and symmetrical as possible, additional areas of close wraps 22, 26 and 30 of wrapping material are provided on the ring having substantially the same number of turns of wrap as tie down area 18. The areas of close wrap 18, 22, 26 and 30 are separated by areas of widely spaced wraps 20, 24, 28 and 32.

In the completed bead bundle 10, the ends 12 and 19 of the wrapping material are trimmed snug against the surface of the bead bundle to eliminate loose ends and assure the uniformity of the bead bundle.

The wrapping material is preferably a flexible synthetic material, in the form of a filament, fiber cord or tape, which has been treated with an adhesive, for example an RFL adhesive, which assures that the wrapping material will bond to rubber used in manufacturing a tire. The wrapping material preferably will have a high tensile strength, good ductility and flexibility and will be non-abrasive to the rubber matrix of the tire. The wrapping material may be selected from the group comprising nylon cord, polyester cord, carbon filaments, polyaromatic amide cord and wire. In the preferred embodiment, the wrapping material will comprise a cord.

Those skilled in the art will recognize that a primary purpose of wrapping material 13 is to hold ends 38 and 40 to the ring bundle to prevent ends 38 and 40 from snagging or puncturing adjacent lamina when used in a tire and that adding additional areas of close wrap on the ring bundle to maintain the uniformity and an even distribution of weight in the ring bundle is optional. It has been found, however, that a ring bundle made as illustrated in FIG. 1 having close wraps 18, 22, 26 and 30 at 90° intervals, not only exhibits good uniformity when used in a tire, but also maintains its cross-section shape when the tire is subjected to vulcanization.

Figure 2:
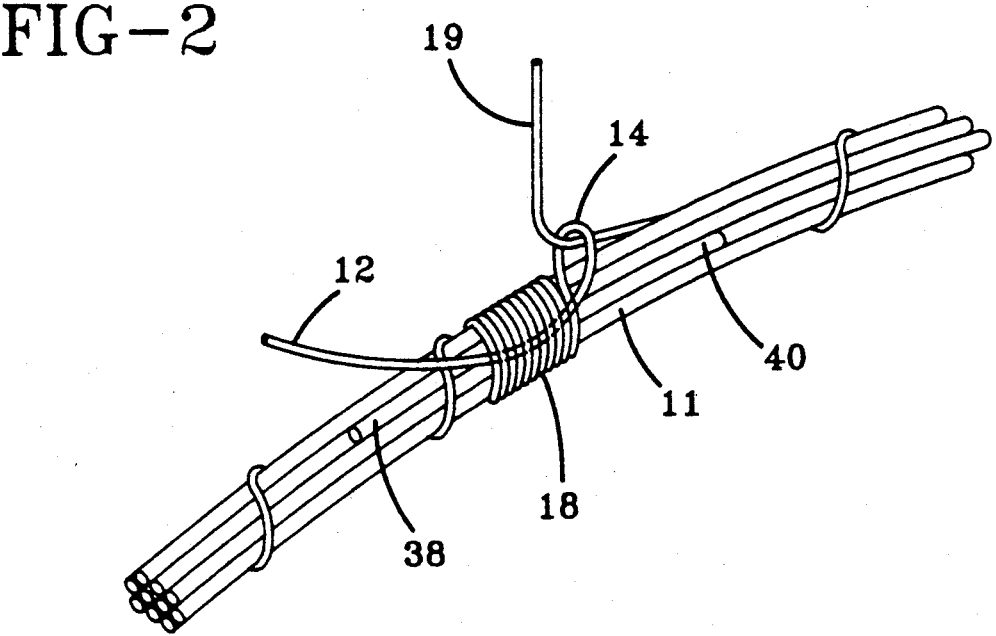
FIG. 2 illustrates an enlarged isolated view of the tie down area of the wrapping material on a bead bundle including the first end, the loop, and the second end of the wrapping material.
Figure 2A:
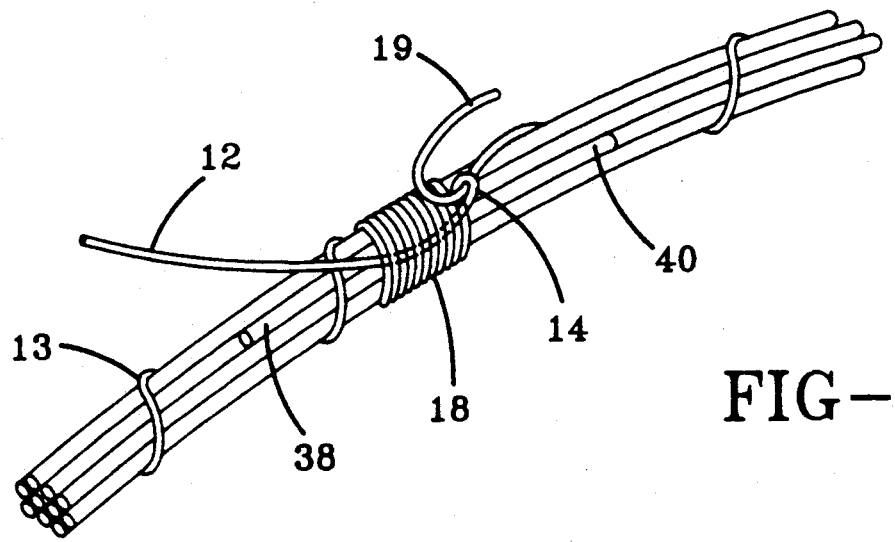
FIG. 2a illustrates the method step where the first end is pulled to tighten the loop.
Figure 2B:
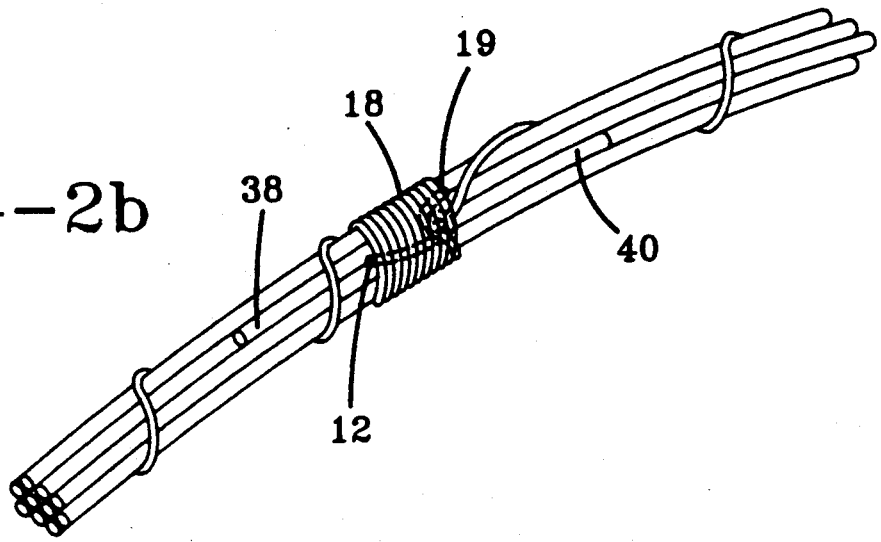
FIG. 2b illustrates method step where the wrapping material is pulled under the close wrap and the ends have been cut flush with the surface of the bead bundle.

With reference now to FIGS. 2, 2a, and 2b, the method of wrapping a bead bundle, which makes it possible to provide a bead bundle without any loose ends of wrapping material, is illustrated. Bead wire is first formed into a plurality of adjacent annular turns as is conventional in the art. As illustrated in FIG. 2, the first step of wrapping the wire is to lay a portion of wrapping material adjacent to first end 12 against bead wire 11 creating loop 14. To aid the manufacturing process, a hook may optionally be provided to maintain loop 14 during subsequent wrapping of the bead wire. After loop 14 is formed and wrapping material adjacent to end 12 is laid down on wire 11, wrapping material, in several close wraps, is wrapped around the wire, simultaneously securing ends 38 and 40 of the wire and holding wrapping material adjacent to end 12 in place in tie down area 18 while leaving end 12 free.

After tie down area 18 is complete, wrapping material 13 is wrapped continuously around the bead ring back to loop 14 and tie down area 18, at which point second end 19 of the wrapping material is passed through loop 14. As illustrated in FIG. 2a, after end 19 passes through loop 14, end 12 of wrapping material 13 is pulled through tie down area 18, closing loop 14, further pulling wrapping material 13 under tie down area 18. Ends 12 and 19 of the wrapping material are then trimmed tight against tie down area 18.

It has been found that a tight wrap and tight tie down can be achieved when wrapping bead wire 11 at room temperature. Those skilled in the art will recognize that if a tighter, more secure wrap is desired, a material that expands at higher temperatures and shrinks on cooling may be applied to annular turns of bead wire 11 at an elevated temperature and then cooled to shrink the wrapping material on bead wire 11.

It will also be apparent to those skilled in the art that the method can be mechanized if desired so that all method steps are automated. This could be done by supplying wrapping material to wrap the annular turns of wire from a payoff device through guiding and cutting fixtures which automatically tighten and cut the wrapping material when the wrapping operation is complete.

Figure 3:
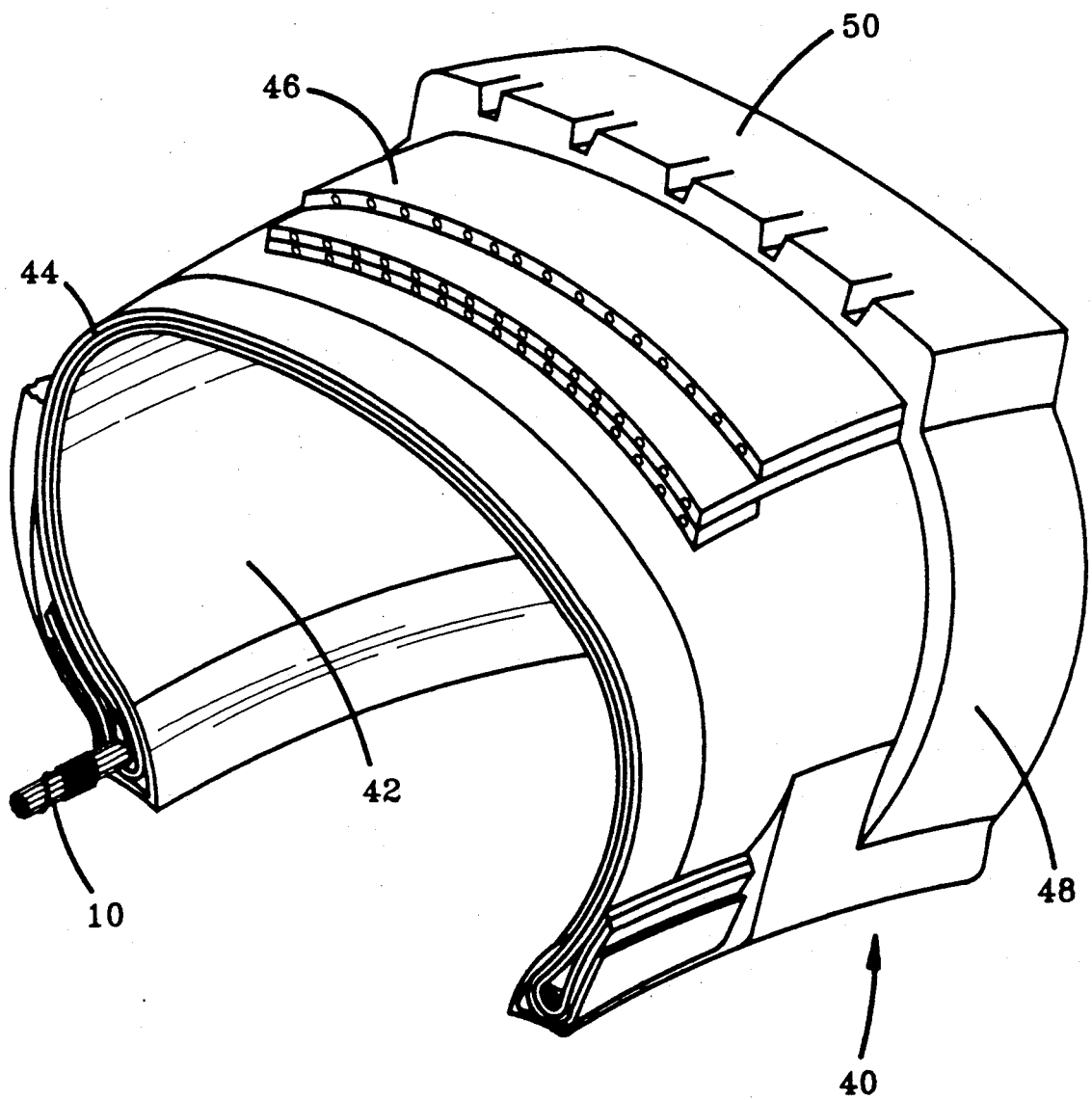
FIG. 3 illustrates a tire of the invention made using the bead bundle of the invention.

With reference to FIG. 3, a pneumatic tire 40 made incorporating the bead ring 10 of the invention is illustrated. The tire is made as is conventional in the tire building art and includes at least a pair of bead rings 10, carcass plies 44 which are wrapped around the bead rings 10, an optional inner liner 42 disposed inwardly of the carcass plies, optional belts or breakers 46 disposed in a crown area of the tire over the carcass plies, tread 50 disposed over the crown area of the tire and sidewalls 48 between the tread 50 and beads 10.

EXAMPLE 1

Dry mount tests were conducted to test the durability of the bead area. In a dry mount test, a tire is mounted on a special test rim without the use of a lubricant. The test results compare the condition of the bead area of a Double Eagle (DE) tire made using a conventional strap bead (control) with a Vector tire made using the bead bundle of the invention. A DE tire was used in the comparison because no Vector tires were available: the same bead and sidewall constructions are used in both tires, and it is believed that the comparison is valid. The bead bundle of the invention tested comprises seven turns of single strand 0.060 wire in a 2/3/2 configuration. X-ray observation of the Vector tires showed excellent bead uniformity. The tires made using the bead bundle of the invention had no cuts or kinks after five mounts on three tires. One DE tire was OK after five mounts, one DE tire had a torn bead after three mounts, and one DE tire had a torn bead after one mount.

|  | ID No. | No. Mounts | Results |
| --- | --- | --- | --- |
| 8 × 8004 DE-strap bead | 72 | 5 | OK |
| P205/75R14 | 75 | 3 | BEAD TORN |
|  | 79 | 1 | BEAD TORN |
| 8W0050J Vector-2/3/2 bead | 1 | 5 | OK |
| P205/75R14 | 2 | 5 | OK |
|  | 3 | 5 | OK |

EXAMPLE 2

A burst test was run comparing the burst strength of the DE and Vector tires described in Example 1. The special test rim on which the tires were mounted is designed specifically for the burst test. In the burst test, a tire is filled to its rated pressure with water and maintained at that pressure for a time sufficient to determine if the tire will survive: the tire is then hydrostaticly inflated to its expected burst pressure and maintained there for a time to determine if the tire will survive: and is then inflated to burst and the water pressure at burst is measured. It is estimated that a tire would separate from a conventional rim at about 100 psi.

It is desirable that a tire burst in the bead area in preference to the sidewall and especially in preference to the crown area of a tire since a tire suffering a bead burst is more controllable on the road than a tire that bursts in the sidewall or the crown. The test illustrates improved strength in the bead area of the tires made using the bead bundle of the invention.

| TIRE | PSI AT BURST | RESULT |
| --- | --- | --- |
| DE 72 | 285 | Bead burst, serial side |
| DE 75 | 310 | Bead burst, serial side |
| DE 79 | 298 | Bead burst, serial side |
| Vector 1 | 314 | Sidewall burst, non serial side |
| Vector 2 | 320 | Sidewall burst, serial side |
| Vector 3 | 319 | Bead burst, serial side |

Serial side refers to the sidewall of the tire containing the lettering, including the serial number of the tire.

EXAMPLE 3

After the burst test, the tires were cut up and excellent uniformity of the bead in the Vector tires was observed.

While specific embodiments of the invention have been illustrated and described, those skilled in the art will recognize that the invention may be variously modified and practiced without departing from the spirit of the invention. The invention is limited only by the scope of the following claims.

What is claimed is:

1. A method of making a knotless bead bundle comprising the steps of:
   (a) disposing at least one wire strand in a plurality of adjacent annular turns:
   (b) attaching a flexible wrapping material to said annular turns by applying a first end of said wrapping material thereto to form a loose loop of wrapping material, and applying said wrapping material over said annular turns and a portion of said wrapping material adjacent to said first end in several close wraps leaving said first end free whereby said several close wraps holds said loop, first free end and said annular turns of wire in place:
   (c) wrapping said annular turns with said wrapping material continuously from said loop 360° substantiality around said annular turns back to said loop:
   (d) passing a second end of said wrapping material through said loop: and
   (e) pulling said first end of said wrapping material to close said loop and pull said wrapping material under said several close wraps.

2. The method of claim 1 comprising the further step of providing several close wraps of wrapping material at several evenly spaced areas on said annular turns to maintain an even distribution of weight on said annular turns.

3. The method of claim 2 which comprises providing four areas of several close wraps of wrapping material on said annular turns wherein a first area of said close wraps corresponds with said loop, and three additional areas of close wraps are disposed 90°, 180° and 270° relative thereto.

4. The method of claim 1 comprising the further steps of applying said wrapping material from a payoff device through a guiding and cutting fixture and around a hook to maintain said loop.

5. The method of claim 1 which comprises the further step of cutting said first end and said second end flush with said several close wraps such that there are no exposed free ends of said wrapping material.

6. The method of claim 1 which comprises the further step of selecting said wrapping material from the group consisting of nylon cord, polyester cord, carbon filaments, polyaromaticamide cord and wire.

7. The method of claim 6 comprising the further step of coating said wrapping material with an adhesive to assure a bond between said wrapping material and rubber used in a tire.

8. The method of claim 1 comprising the further steps of applying said wrapping material to said annular turns in an expanded condition and causing said wrapping materials to shrink after application to ensure a tight fit between said wrapping material and said annular turns.

* * * * *